United States Patent [19]
Gilmour

[11] 4,052,693
[45] Oct. 4, 1977

[54] DEPTH SOUNDER

[75] Inventor: George A. Gilmour, Severna Park, Md.

[73] Assignee: Westinghouse Electric Corporation, Pittsburgh, Pa.

[21] Appl. No.: 663,339

[22] Filed: Mar. 3, 1976

[51] Int. Cl.² ............................................... G01S 9/68
[52] U.S. Cl. .................................................... 340/3 R
[58] Field of Search ................................ 340/1 R, 3 R

[56] References Cited
U.S. PATENT DOCUMENTS

| | | | |
|---|---|---|---|
| 3,086,195 | 4/1963 | Halliday | 340/1 R |
| 3,616,682 | 11/1971 | Golis et al. | 340/10 X |
| 3,836,948 | 9/1974 | Burckhardt et al. | 340/1 R |
| 3,943,482 | 3/1976 | Murphree et al. | 340/3 R |

Primary Examiner—Richard A. Farley
Attorney, Agent, or Firm—D. Schron

[57] ABSTRACT

A depth sounder in which the transducer beam is in the form of a section of hollow cone. With the hollow conical beam, the slant range to the bottom in all directions is the same and minimum depth determination over a path width of 2 to 4 times the depth of the water may be made.

12 Claims, 11 Drawing Figures

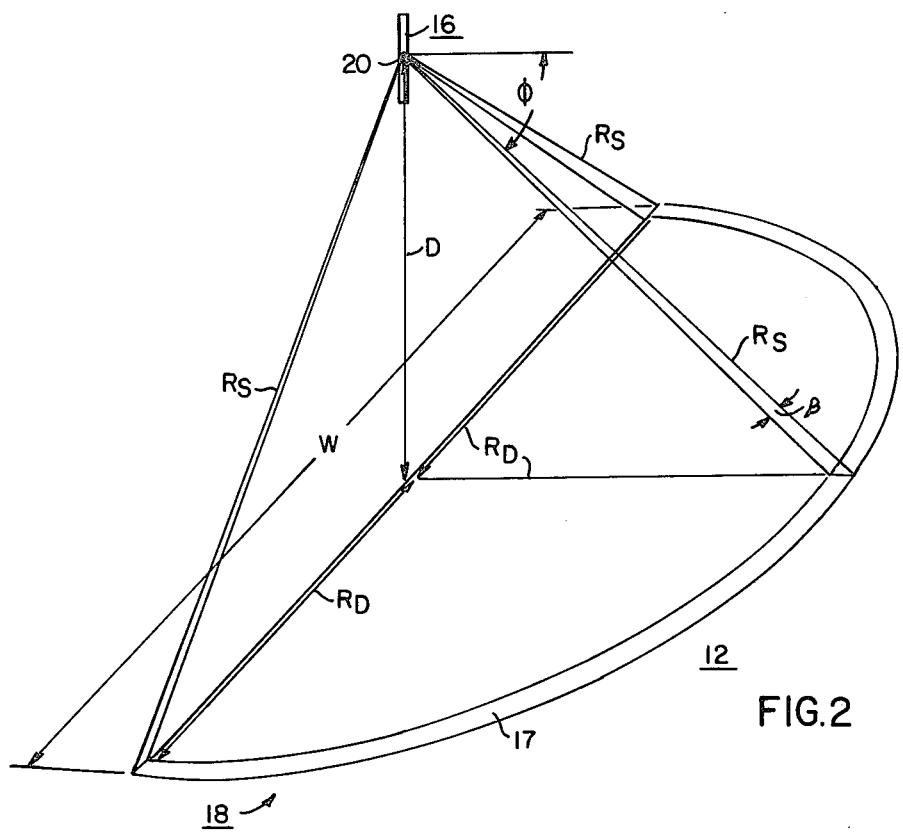
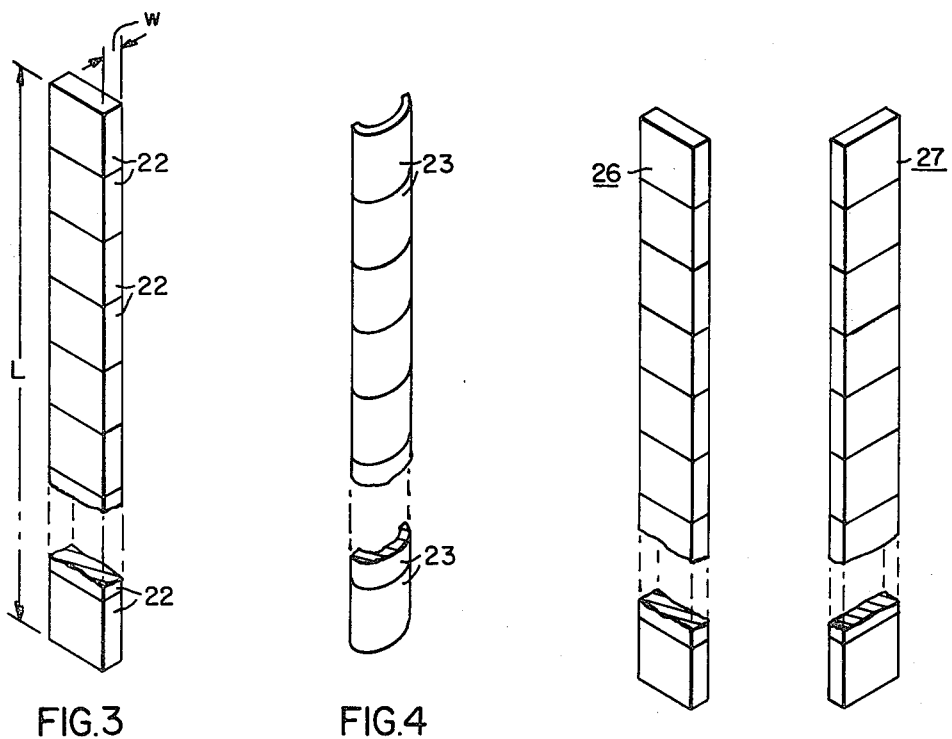
FIG.2
FIG.3  FIG.4  FIG.5

DEPTH SOUNDER

BACKGROUND OF THE INVENTION

1. Field of the Invention

This invention in general relates to sonar apparatus, and particularly to an acoustic depth sounder.

2. Description of the Prior Art

A problem common to coastal and inland shipping channels is a question of whether or not the channel is deep enough and whether it is navigable with respect to obstructions protruding from the bottom.

The present technique for determining if the channel is deep enough is to make repeated parallel passes using a depth finder or sounder. In general, it is impractical to make enough parallel passes close enough together to make sure nothing protrudes above the desired depth. A technique commonly used to check for obstructions protruding from the bottom is to suspend a horizontal chain between two vessels at the depth to be checked. The two vessels then proceed down the channel with the chain snagging anything that protrudes above the depth being checked.

A broad beam angle would increase the area covered however, the depth resolution would be reduced. Increased resolution and coverage can be obtained with a multi-beam system wherein a plurality of adjacent beams are formed for each acoustic transmission. However, such a sophisticated system would be relatively expensive and would require specially designed displays.

SUMMARY OF THE INVENTION

The present invention is an improved depth sounder which is capable of indicating minimum depth over a swath width of 2 to 4 times the depth of the water thereby greatly increasing the speed with which navigation channels can be checked for obstructions or proper depth.

The apparatus is disposed for travel along a course over a target area such as a channel and includes transducer means whereby a transducer beam is formed which intersects the target area such that points in the intersection are substantially equally distant from the transducer. In the described embodiment, the transducer beam form is a segment of a hollow cone which may be generated utilizing a plurality of transducer segments forming an elongated transducer which operates in a substantially vertical orientation over the target area. Means are provided for periodically energizing the transducer and thereafter detecting acoustic returns.

In a further refinement, two such transducers are provided and are operable to form substantially coextensive beams so that phase comparison techniques may be utilized for determining the approximate location of any detected protrusion.

BRIEF DESCRIPTION OF THE DRAWINGS

FIG. 2 is a view of the beam of FIG. 1 with various distances and angles designated;

FIGS. 3 and 4 are views of transducer segments or elements which may be utilized to form the transducer;

FIG. 5 is a view of two transducer elements which may be utilized to obtain 180° coverage;

DESCRIPTION OF THE PREFERRED EMBODIMENT

Figure 1:
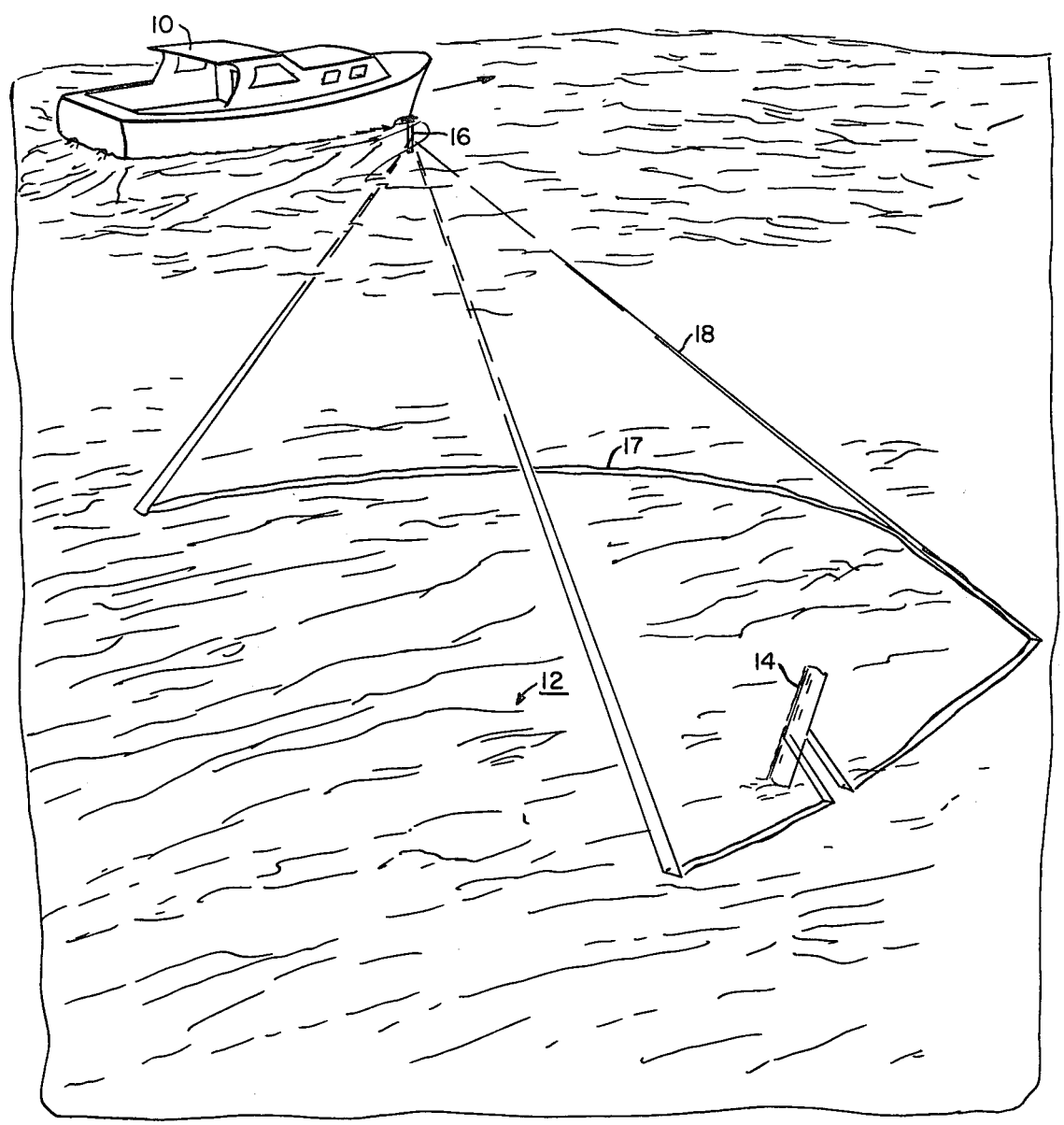
FIG. 1 is a pictorial view of an embodiment of the apparatus in operation.

Referring now to FIG. 1, there is illustrated a vessel 10 traveling in the direction of the arrow over a target area 12 the minimum depth of which is to be checked, as well as the existence of debris on the bottom or protuberances such as at 14. Transducer 16 generates a beam, the intersection 17 of which with the bottom 12 defines a plurality of points which are substantially equally distant from the transducer 16. In the preferred embodiment this beam is in the form of a segment of a hollow cone 18. With such beam the slant range to the bottom in all directions is the same and makes possible the detection of targets closer to the bottom in all directions than is possible with, for example, a fan beam, and in the intended operation, only the forward half of a conical beam need be transmitted (and/or received).

FIG. 2 again illustrates the conically shaped beam 18 and serves to define certain measurements. Beam 18 may be generated by transducer 16 in the form of an elongated line array similar to that used in side-looking sonar systems, and mounted with its length in the vertical direction with its normally produced fan-shaped beam electrically steered down by an angle $\phi$. The resulting beam pattern is the hollow cone whose axis is in line with the line array transducer and whose apex is at point 20, halfway between the ends of the transducer.

The slant range to points around the intersection area 17 is $R_S$, the height of the transducer above the bottom is D, the radius of the circle formed on the bottom is $R_D$, the swath width is W or $2R_D$, and the beam thickness is $\beta$. From geometric considerations:

$$R_s = \frac{D}{\sin \phi} \quad (1)$$

$$R_D = D \cot \phi \quad (2)$$

$$\beta = \frac{\lambda}{L \cos \phi} \quad (3)$$

where L is the length of transducer 16 and $\lambda$ is the operating wavelength. An appropriate beam thickness $\beta$ might be in the range of 0.5° to 1° and would depend upon the accuracy required. The ratio of swath width to depth will depend on how shallow a depression angle $\phi$ can be tolerated. From a practical standpoint such ratio may be from 2 to 4, with a practical maximum of 4 requiring a $\phi$ equal to 26.6°. Thus, a 200 foot wide swath could be checked for a 50 foot depth on a single pass. Any acoustic return, after a transmission, that is received earlier than a distance corresponding to D/Sin $\phi$ indicates that there is something above the required channel depth.

Various possible configurations exist for forming the hollow conical beam 18. For example with reference to FIG. 3, there is illustrated a conventional side-look sonar transducer made up of a plurality of segments or active elements 22 aligned end to end in a line array of length L. The conventional electrical connections, backing material and covering are not illustrated. With an element width w small compared to a wavelength and with electrical steering of the beam down by an angle $\phi$, the resultant beam would be as illustrated in FIGS. 1 and 2.

A good 180° hollow conical beam pattern can also be obtained with the plurality of active elements 23, illustrated in FIG. 4, such elements being in the form of half cylinders.

An alternative would be as illustrated in FIG. 5 wherein there is illustrated transducers 26 and 27 each made up of a plurality of active elements aligned in end to end relationship with the transducers being oriented at +45° and −45° respectively to the direction of travel. If each transducer had a 90° beam width, the forward 180° would be covered.

Other arrangements, such as the use of acoustic lenses, are also possible.

Figure 6:
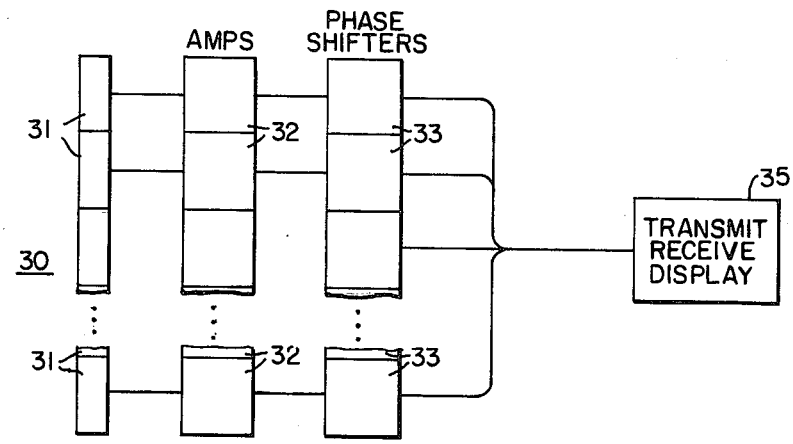
FIG. 6 is a block diagram of the transducer segments with various electronic processing circuits.
Figure 7:
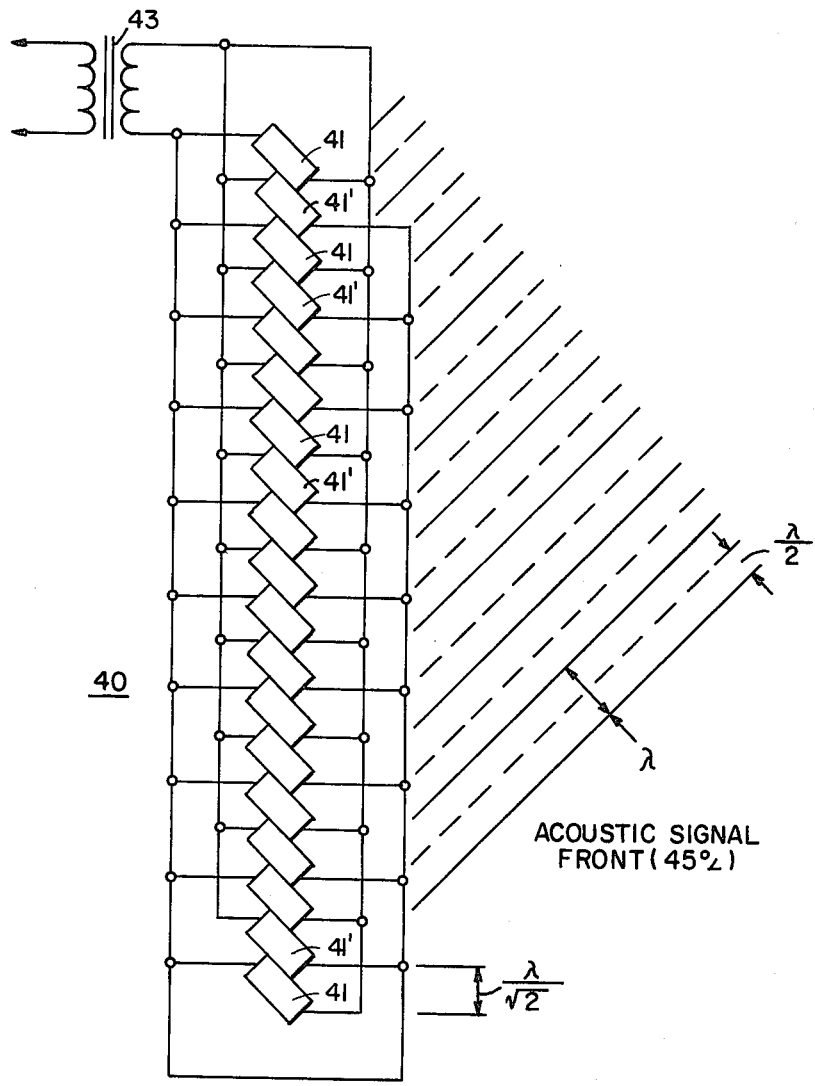
FIG. 7 is a view of a transducer which has a certain fixed beam angle.

FIG. 6 illustrates an arrangement for a depth sounder in accordance with the present invention, which utilizes electrical beam steering. The typical line array transducer 30 is made up of a plurality of active elements 31 each in signal communication with a respective amplifier 32. A plurality of phase shifters 33 are connected in each line between the amplifiers 32 and conventional transmit, receive and display circuitry 35. In a conventional and well known manner, by proper choice of phase shifters 33, the transmit beam and/or receive beam can be given a desired depression angle $\phi$. Other conventional arrangements may also be used, such as the use of delay lines. As an alternative to beam steering by means of phase shifters or delay lines, the arrangement of FIG. 7 illustrates the transducer 40 made up of a plurality of active elements 41 and 41', the active faces of alternate elements being spaced at a distance $\lambda/2$ from one another (in the direction of the beam) with the operating polarity from matching transformer 43 being reversed on every other element. With such an arrangement a fixed depression angle of 45° is provided. FIG. 7 illustrates the acoustic signal wave fronts at the 45° angle and for such an arrangement the vertical distance between the centers of the transducer active elements is $\lambda/\sqrt{2}$.

Figure 8:
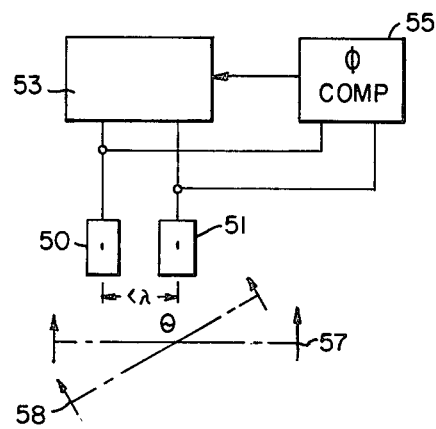
FIG. 8 is a block diagram illustrating apparatus which may be utilized for determining the approximate location of protrusions from the bottom.

The simple system thus far illustrated will indicate if the channel is shallower than the required minimum depth or if an obstruction protrudes from the bottom. However, the location around the beam will not be known since the same indication will show, whether the obstruction is forward, to port or to starboard. For many operations this is sufficient. A marker buoy could be put over the side of the vessel and the general area where the early return occurred can be examined. For other operations, however, a more definite indication of the protrusion would be desired. For such instance, the apparatus may be constructed to incorporate well known phase comparison techniques of other sonar systems for determining target bearing. FIG. 8 illustrates the arrangement. Two line transducers 50 and 51 are provided and FIG. 8 illustrates these transducers in plan view. The electronic section 53 contains the conventional depth sounding equipment together with the beam steering circuitry and is utilized for energizing one, or both of the transducers 50 and 51. Both transducers are utilized on reception and their outputs are connected to phase comparison circuit 55 which in a well known manner will provide an indication of the bearing of the acoustic reflection from the protuberance. For example, transducers 50 and 51 are spaced equal to or less than a wavelength apart. Wavefront 57 is from a protruding object directly in front of the apparatus and will simultaneously energize the transducer elements such that they all provide the same output signal at the same time and such will be indicated to the display in the electronic portion 53. Suppose, however, that the object is at a bearing relative to the direction of apparatus travel that the wavefront 58 from the object impinges upon the array at an angle $\theta$. In such instance the active elements of transducer 51 will be energized first and, depending upon the angle $\theta$ the active elements of transducer 50 will be energized a certain time thereafter, such that the phase comparison circuitry 55 will detect such difference and provide an indication of the angle $\theta$ to the electronic circuitry and display 53.

Figure 9:
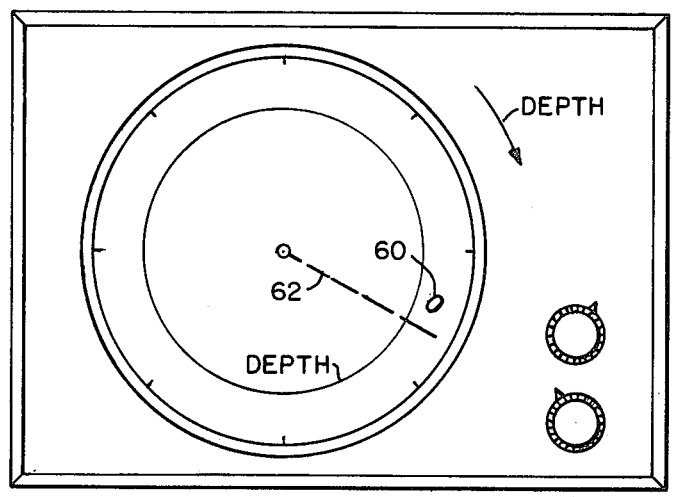
FIGS. 9 and 10 illustrate typical displays.

The apparatus of the present invention is operable with a variety of displays. The commonly used digital read-out, if directly used, would indicate the slant range $R_s$, to the bottom. If the apparatus is used with a constant depression angle $\phi$, the design can easily be scaled by sin $\phi$, to convert slant range to depth. The less expensive depth sounder display illustrated in FIG. 9 may also be utilized. The display has depth plotted circumferentially and includes a sweeping neon light 60 which when it passes the zero depth position causes an acoustic transmission, with the reflection therefrom being utilized to energize the light during its travel. The depth scale would be modified from the conventional depth scale by the relationship illustrated in FIG. 1. A cursor mark 62 may be placed on a display as an indication of minimum channel depth thus giving a warning to the operator if the neon light activates prior to cursor 62.

Figure 10:
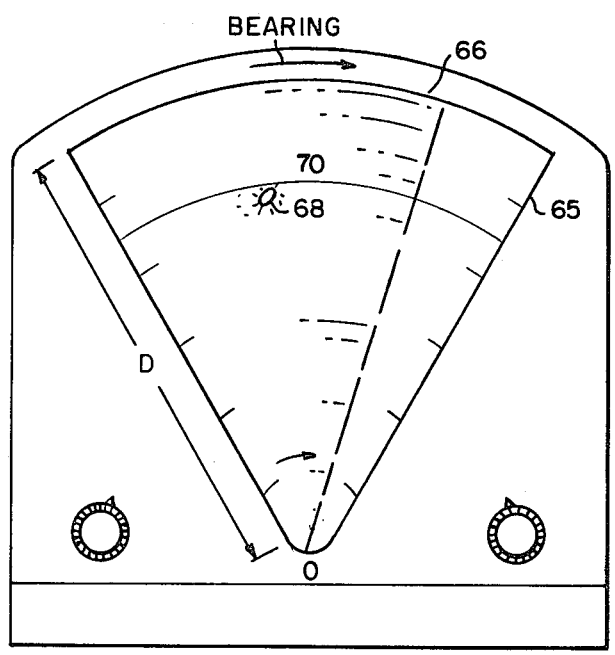

With the phase comparison addition as illustrated in FIG. 8, a typical display may be as illustrated in FIG. 10 wherein the apparatus provides a sector scan 65 on a cathode ray tube 66. A target will indicate as a highlight 68 during the scanning of the cathode ray beam with the distance of the highlight from the origin O being indicative of depth, and its angular position being indicative of bearing. As was the case with respect to the display of FIG. 9, a cursor 70 may be placed on the cathode ray tube face.

Figure 11:
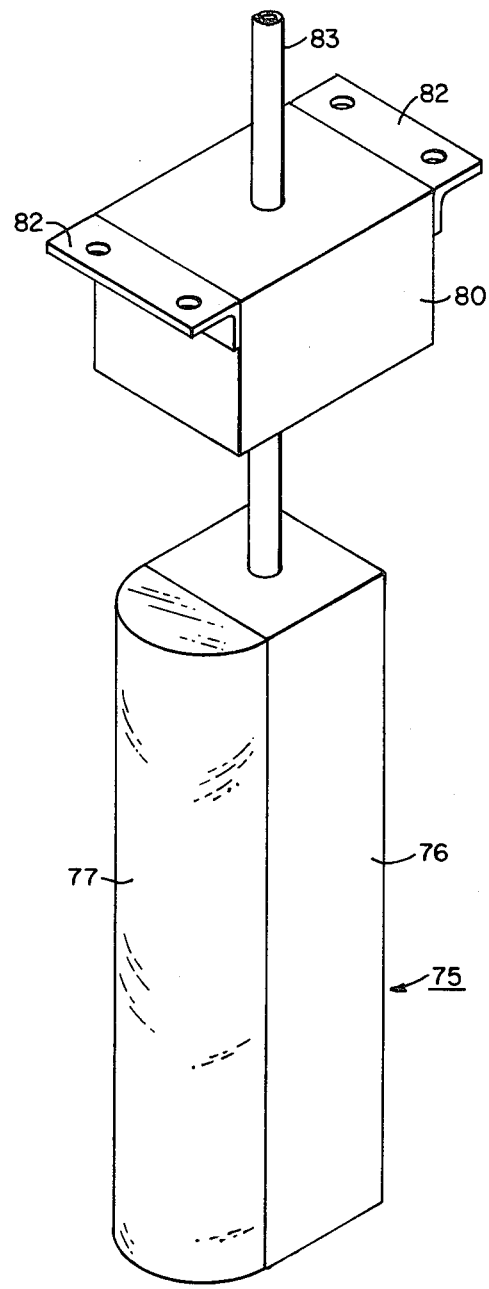
FIG. 11 is a pictorial view of the apparatus together with stabilizing means.

Due to movement of the boat through the water, the apparatus operation may deviate somewhat from the ideal and the hollow conical beam forward will not be exactly perpendicular to the plane of the bottom at all times. Slight deviation, however, is within acceptable tolerable limits. Where considerably objectionable movement of the carrying vessel is envisioned, gyro stabilization may be provided for the transducer, as illustrated in FIG. 11 which shows the vertically oriented transducer 75 complete with its housing 76 and covering member 77 such as polyurethane. A stabilization mechanism 80 is provided and may include a conventional dual gimbal arrangement to achieve two axis stabilization. Although the stabilizing mechanism may be mounted over the bow of the boat, it would be preferable to have a throughhull mount at the center of pitch and roll of the boat for better stabilization and for this purpose there is provided mounting brackets 82 and a feedthrough conduit 83 for the passage of electrical conductors.

What is claimed is:
1. Depth sounding apparatus, comprising:
   A. transducer means designed for operation over a target area;

B. means for periodically transmitting acoustic energy to impinge upon said target area;

C. means in cooperative association with said transducer means for forming, for each said transmission, a transducer beam which intersects said target area in an elongated curved area such that points in said intersection are substantially equally distant from a predetermined point associated with said transducer means.

2. Depth sounding apparatus, comprising:

A. transducer means designed for operation over a target area;

B. means for periodically transmitting acoustic energy to impinge upon said target area;

C. means in cooperative association with said transducer means for forming, for each said transmission, a transducer beam having the shape of a segment of a hollow cone which intersects said target area, with the apex of said cone being located at said transducer means.

3. Depth sounding apparatus, comprising:

A. a plurality of transducer active elements forming an elongated transducer designed for operation in a substantially vertical orientation over a target area;

B. means in cooperative association with said active elements for forming a transducer beam having the shape of a segment of a hollow cone which intersects said target area; and C. means for periodically energizing said transducer and thereafter detecting acoustic returns.

4. Apparatus according to claim 2 wherein:

A. said segment is in the order of 180°.

5. Apparatus according to claim 3 wherein:

A. said means for forming said beam includes means for relatively shifting the phase of said active elements signals.

6. Apparatus according to claim 3 wherein:

A. said active elements are oriented at a predetermined angle with respect to vertical;

B. adjacent ones of said active elements being operated 180° out of phase with one another;

C. the distance in the direction of said beam between active faces of adjacent active elements being substantially $\lambda/2$, where $\lambda$ is the operating wavelength.

7. Apparatus according to claim 3 wherein:

A. said active elements are rectangular.

8. Apparatus according to claim 5 wherein:

A. said active elements are cylindrical.

9. Apparatus according to claim 8 wherein:

A. said active elements are half cylinders.

10. Apparatus according to claim 2 wherein:

A. said transducer means includes two line array transducers in side by side relationship and each oriented at a predetermined angle with respect to direction of travel over said target area.

11. Apparatus according to claim 10 wherein:

A. one transducer is oriented at an angle of $+45°$ and the other at an angle of $-45°$ with respect to direction of travel of said target area.

12. Depth sounding apparatus comprising:

A. a first elongated transducer for operation over a target area;

B. means for periodically transmitting acoustic energy to impinge upon said target area;

C. means in cooperative association with said transducer for forming, for each said transmission, a transducer beam having the shape of a segment of a hollow cone which intersects said target area;

D. a second elongated transducer spaced from said first transducer by a distance $\leq \tau$, where $\tau$ is the operating wavelength;

E. means in cooperative association with said second transducer for forming a beam similar to and in overlapping relationship with, the beam of said first transducer; and F. means for comparing the relative phase of the signals provided by said transducers in response to acoustic returns from said target area.

* * * * *